(12) United States Patent
Steiner et al.

(10) Patent No.: US 7,702,423 B2
(45) Date of Patent: Apr. 20, 2010

(54) METHOD AND APPARATUS TO CONTROL THE RATE OF FLOW OF A FLUID THROUGH A CONDUIT

(75) Inventors: Adrian Steiner, Calgary (CA); Mike Fredric Grossman, Calgary (CA)

(73) Assignee: Weatherford Canada Partnership c/o Weatherford International Ltd., Houston, TX (US)

( * ) Notice: Subject to any disclaimer, the term of this patent is extended or adjusted under 35 U.S.C. 154(b) by 86 days.

(21) Appl. No.: 10/807,372

(22) Filed: Mar. 24, 2004

(65) Prior Publication Data

US 2005/0119796 A1  Jun. 2, 2005

(30) Foreign Application Priority Data

Nov. 27, 2003  (CA) ................................. 2450994

(51) Int. Cl.
*G05D 7/00* (2006.01)
(52) U.S. Cl. ............................. 700/282; 702/100; 137/2
(58) Field of Classification Search ......... 700/282–284; 137/2, 7, 8, 101, 110, 14, 485, 486, 487.5, 137/489, 557; 251/5; 175/5, 25, 38, 48; 702/9, 12, 45, 50, 100, 113, 114; 166/252.1, 166/358
See application file for complete search history.

(56) References Cited

U.S. PATENT DOCUMENTS

| | | | | |
|---|---|---|---|---|
| 3,578,077 | A * | 5/1971 | Glenn et al. ................. | 166/267 |
| 4,091,881 | A   | 5/1978 | Maus |  |
| 4,197,868 | A * | 4/1980 | Carson ......................... | 137/7 |
| 4,247,312 | A   | 1/1981 | Thakur et al. |  |
| 4,374,544 | A * | 2/1983 | Westerman et al. ....... | 166/252.4 |
| 4,440,239 | A * | 4/1984 | Evans .......................... | 700/282 |
| 4,942,763 | A * | 7/1990 | Harpster ..................... | 73/202.5 |
| 5,010,966 | A   | 4/1991 | Stokley |  |

(Continued)

FOREIGN PATENT DOCUMENTS

CA    1094349    1/1981

(Continued)

OTHER PUBLICATIONS

Preliminary Report of Patentability Issued in connection with International Patent Application No. PCT/CA2004/001967.

*Primary Examiner*—Charles R Kasenge
(74) *Attorney, Agent, or Firm*—Merek, Blackmon, & Vorhees, LLC (57) ABSTRACT

An apparatus to control the rate of flow of a stream of pressurized fluid through a conduit. The apparatus comprises a flow measurement device operatively connected to the conduit, a flow control device operatively connected to the conduit, and a controller operatively connected to the flow control device. The flow measurement device generates an output signal proportionate to the rate of flow of fluid therethrough. The flow control device includes an adjustable orifice wherein upon the opening of the orifice a portion of the stream of pressurized fluid is independently released from the conduit by the flow control device. The controller receives the output signal generated by the flow measurement device and causes the adjustable orifice in the flow control device to open or close as necessary to maintain the flow of pressurized fluid as measured by the flow measurement device within predetermined limits.

32 Claims, 4 Drawing Sheets

U.S. PATENT DOCUMENTS

| | | | |
|---|---|---|---|
| 5,382,411 A * | 1/1995 | Allen | 422/131 |
| 5,388,650 A | 2/1995 | Michael | |
| 5,415,776 A | 5/1995 | Homan | |
| 5,426,137 A * | 6/1995 | Allen | 523/318 |
| 5,511,582 A * | 4/1996 | Hudson | 137/494 |
| 5,579,283 A * | 11/1996 | Owens et al. | 367/83 |
| 5,694,966 A | 12/1997 | Holder | |
| 5,749,422 A | 5/1998 | Michael | |
| 5,775,442 A | 7/1998 | Speed | |
| 5,827,357 A | 10/1998 | Farion | |
| 5,857,522 A * | 1/1999 | Bradfield et al. | 166/267 |
| 5,862,869 A | 1/1999 | Michael | |
| 5,921,962 A | 7/1999 | Kriesel | |
| 5,928,519 A | 7/1999 | Homan | |
| 6,035,952 A | 3/2000 | Bradfield et al. | |
| 6,041,873 A | 3/2000 | Michael | |
| 6,048,175 A | 4/2000 | Corlew | |
| 6,206,108 B1 * | 3/2001 | MacDonald et al. | 175/24 |
| 6,206,113 B1 | 3/2001 | Michael | |
| 6,234,258 B1 | 5/2001 | Karigan | |
| 6,312,209 B1 * | 11/2001 | Duell et al. | 414/408 |
| 6,315,813 B1 | 11/2001 | Morgan et al. | |
| 6,328,107 B1 | 12/2001 | Maus | |
| 6,328,118 B1 | 12/2001 | Karigan et al. | |
| 6,413,297 B1 | 7/2002 | Morgan et al. | |
| 6,443,245 B2 | 9/2002 | Michael | |
| 6,467,542 B1 * | 10/2002 | Kostrov et al. | 166/249 |
| 6,494,262 B1 | 12/2002 | Chitty | |
| 6,568,416 B2 * | 5/2003 | Tucker et al. | 700/284 |
| 6,662,885 B2 | 12/2003 | Krill | |
| 6,668,943 B1 * | 12/2003 | Maus et al. | 175/5 |
| 6,722,436 B2 | 4/2004 | Krill | |
| 6,790,367 B2 | 9/2004 | Schmigel et al. | |
| 6,929,068 B2 | 8/2005 | Chitty | |
| 6,981,561 B2 * | 1/2006 | Krueger et al. | 175/96 |
| 7,243,735 B2 * | 7/2007 | Koederitz et al. | 175/40 |
| 2002/0117214 A1 * | 8/2002 | Tucker et al. | 137/487.5 |
| 2003/0066650 A1 * | 4/2003 | Fontana et al. | 166/358 |
| 2003/0078751 A1 * | 4/2003 | Juhasz | 702/114 |
| 2003/0085036 A1 | 5/2003 | Curtis et al. | |
| 2004/0007131 A1 | 1/2004 | Chitty et al. | |
| 2006/0157282 A1 | 7/2006 | Tilton et al. | |

FOREIGN PATENT DOCUMENTS

| | | |
|---|---|---|
| CA | 1179916 | 12/1984 |
| CA | 2373515 | 12/2000 |
| WO | WO 86/00731 | 1/1986 |
| WO | WO 2004/046840 | 6/2004 |

* cited by examiner

METHOD AND APPARATUS TO CONTROL THE RATE OF FLOW OF A FLUID THROUGH A CONDUIT

BACKGROUND OF THE INVENTION

In many situations there is a desire to produce a stream of pressurized fluid at a flow rate that is below the minimum or output rate of a pump that comprises part of a particular piece of equipment or that is situated at a particular site or location. For example, in many oil or gas field applications (including underbalanced drilling situations) it is necessary to pump or inject fluid into a wellbore at rates below the output rate of the pump that is supplied with a drilling or service rig. In such cases a separate pump that is designed to pump at the low rate required for a specific operation must typically be acquired and put to use.

If properly sized for a given application, utilization of a secondary pump will satisfy the particular needs at hand, but also presents a number of limitations. First, a secondary pump and pumping system can add significantly to cost in terms of capital outlay or rental charges, and also in terms of increased operating and maintenance costs. In addition, a secondary pump designed for producing a stream of pressurized fluid at a particular flow rate will, as in the case of the primary rig pump, be of little use in the event that the operational parameters should change and should there be a need or desire for a fluid flow rate below the minimum pumping rate of the secondary pump. Where there is the expectation that a required minimum flow rate may change, more complex and sophisticated pumps having variable flow rates can be utilized, but once again only at significantly increased costs.

SUMMARY OF THE INVENTION

The invention therefore provides both a method and an apparatus that may be used in conjunction with available pumping systems in order to produce a stream of pressurized fluid at a flow rate below the output rate of an available pump. In one aspect the invention also incorporates the use of automated controls to allow for adjustments to be made to the flow rate as required.

Accordingly, in one of its aspects the invention provides an apparatus to control the rate of flow of a stream of pressurized fluid through a conduit, the apparatus comprising a flow measurement device for generating an output signal proportionate to the rate of flow of said fluid there through, a flow control device operatively connected to said conduit, said flow control device including an adjustable orifice wherein upon the opening of said orifice a portion of said stream of pressurized fluid is independently released from said conduit by said flow control device; and, a controller operatively connected to said flow control device for receiving said output signal generated by said flow measurement device, said controller causing said adjustable orifice in said flow control device to open or close as necessary to maintain the flow of pressurized fluid as measured by said flow measurement device within pre-determined limits and wherein said portion of said stream of pressurized fluid independently released from said conduit by said flow control device is injected into the work stream of a wellbore and said flow control device is part of a continuous loop fluid circuit and is adjustable to control the release of pressurized fluid from the continuous loop fluid circuit.

In a further aspect the invention provides an apparatus to control the rate of flow of pressurized fluid through a conduit connected to a pump, the apparatus permitting the discharge of fluid from said conduit at a rate below the output rate of the pump, the apparatus comprising a flow measurement device operatively connected to said conduit and generating an output signal proportionate to the rate of flow of said fluid therethrough, an adjustable flow control device operatively connected to said conduit, said flow control device permitting a portion of said pressurized fluid to be independently released from said conduit to maintain the flow of pressurized fluid as measured by said flow measurement device within pre-determined limits.

The invention also concerns a method of controlling the rate of flow of a stream of pressurized fluid through a conduit, the method comprising the steps of determining the rate of flow of fluid through a portion of said conduit and generating a signal proportionate to said fluid flow rate, directing said signal to a controller operatively connected to a flow control device, said flow control device operatively connected to said conduit and including an adjustable orifice wherein upon the opening of said orifice a portion of said stream of pressurized fluid is independently released from said conduit by said flow control device; and, with said controller, comparing said signal to a pre-determined value and activating said flow control device to open or close said adjustable orifice as necessary to maintain the flow of pressurized fluid as measured by said flow measurement device within pre-determined limits.

In yet a further aspects the invention pertains to a method to control the rate of flow of pressurized fluid through a conduit connected to a pump, the method permitting the discharge of said fluid from said conduit at a rate below the output rate of the pump, the method comprising the steps of determining the rate of flow of fluid through a portion of said conduit using a flow measurement device and generating a signal proportionate to said fluid flow rate; and, comparing said generated signal to a pre-determined value and activating an adjustable flow control device operatively connected to said conduit to permit a portion of said pressurized fluid to be independently released from said conduit to maintain the flow of pressurized fluid as measured by said flow measurement device within pre-determined limits.

Accordingly, in one of its aspects the invention provides an apparatus to control the rate of flow of a stream of pressurized fluid through a conduit connected to a pump that draws fluid from a reservoir, the apparatus comprising a flow measurement device for generating an output signal proportionate to the rate of flow of said fluid there through, said flow measurement device being operatively connected to said conduit, a flow control device operatively connected to said conduit downstream of said flow measurement device, said flow control device including an adjustable orifice wherein upon the opening of said orifice a portion of said stream of pressurized fluid is independently released from said conduit by said flow control device, and a controller operatively connected to said flow control device for receiving said output signal generated by said flow measurement device and for causing said adjustable orifice in said flow control device to open or close as necessary to maintain the flow of pressurized fluid as measured by said flow measurement device within pre-determined limits wherein said portion of said stream of pressurized fluid independently released from said conduit by said flow control device is injected into the work stream of a wellbore and said flow control device, together with the pump and reservoir, forming part of a continuous loop fluid circuit, said flow control device being adjustable to control the release of pressurized fluid from the continuous loop fluid circuit.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
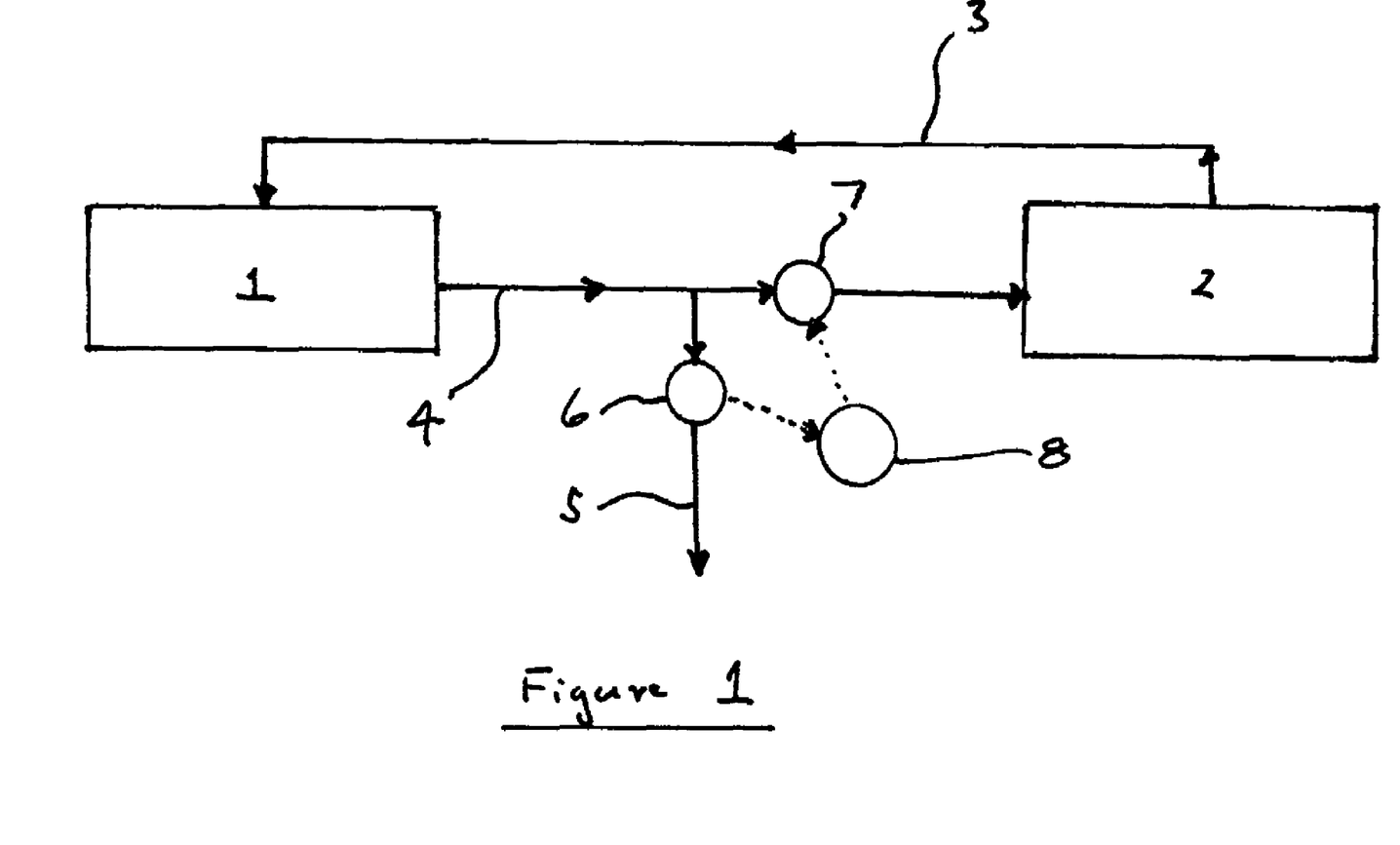
FIG. 1 is a schematic flow diagram depicting the primary aspects of a preferred embodiment of the present invention.

Referring to FIG. 1, there is shown in schematic form a fluid flow circuit that incorporates a preferred embodiment of the present invention. In FIG. 1 a pump 1 draws fluid from a tank or reservoir 2 through a suction line 3 and delivers a stream of pressurized fluid through a pump discharge pipe 4. Where the application of the invention concerns a drilling or service rig, pump 1 will represent a rig pump, typically of the type capable of producing a flow rate of from 300 to 1500 litres per minute. It should be understood that the invention could equally be applicable to other situations aside from drilling or service rigs. However, for illustration purposes the description that follows herein is generally directed to drilling or service rig applications.

In accordance with the present invention, there is provided a means to control the rate of flow of a stream of pressurized fluid traveling or discharged through a conduit connected to the output of pump 1. In FIG. 1 the conduit in question is indicated generally by reference numeral 5. In this embodiment the invention is comprised generally of a flow measurement device 6 and a flow control device 7. The invention may also include a controller 8 that is operatively connected to both flow measurement device 6 and flow control device 7. Depending upon the specific nature of flow measurement device 6, flow control device 7 and controller 8, and also depending upon the degree of sophistication and automation desired, the specific operation of the primary component parts of the invention may vary. Nevertheless, in each instance there is provided a mechanism that permits the control of the rate of flow of fluid that travels through, and/or that is discharged from, conduit 5. In particular there is provided a mechanism that enables fluid to flow through and/or be discharged from conduit 5 at a rate below the output rate of pump 1 (for example at a rate of approximately 100 litres per minute as is often required when injecting into a wellbore). The particular nature and operation of the components and the preferred embodiments of the invention are described in more detail as follows.

Preferably, a portion of the stream of pressurized fluid is independently released from the conduit by flow control device 7 and is injected into the work stream of the wellbore and the flow control device 7 is part of a continuous loop fluid circuit and is adjustable to control the release of pressurized fluid from the continuous loop fluid circuit.

In the embodiment of the invention depicted in FIG. 1, flow measurement device 6 is operatively connected to conduit 5 such that the flow measurement device is capable of measuring or determining the rate of flow of fluid through the conduit. In one aspect of the invention flow measurement device 6 includes a turbine in communication with the stream of pressurized fluid flowing through conduit 5. It is expected that in most instances the turbine would be an in-line turbine located within the conduit. In other cases the turbine may be situated in a pipe or duct connected in parallel to conduit 5 such that it may be isolated through the use of valves for purposes of maintenance or replacement.

Where flow measurement device 6 is comprised of a turbine commonly available mechanical or electronic sensing means will be utilized to count and record the number of revolutions of the turbine, from which a fluid flow rate can be determined. One such commonly used electronic sensing means involves the placement of one or more magnets on the turbine such that the magnets are caused to rotate in a circular path as fluid flows past the turbine. Situated in the housing surrounding the turbine, and in close proximity thereto, is a reed switch containing magnetically actuated reeds that effectively open and close an electric circuit with fluctuations in the magnetic field created through the rotation of the turbine. Counting the number of times that the reed switch is opened and closed over a given time frame, in conjunction with the dimensions of the turbine and the size of the conduit within which it is situated, can thus be used to calculate and determine a volumetric flow rate.

It will be appreciated that a variety of other flow measurement devices could equally be used while remaining within the broad scope of the invention. For example, in an alternate embodiment flow measurement device 6 may include a pressure sensor that outputs a signal proportionate to the pressure of fluid measured within conduit 5. The pressure of the fluid within the conduit may then be used to help calculate a flow rate. In yet a further embodiment flow measurement device 6 may include a pitot tube connected to conduit 5, the output from which may be used to determine a fluid flow rate. It should be noted that other volumetric measuring devices and methods could equally be used to determine the flow of pressurized fluid through conduit 5.

Figure 2:
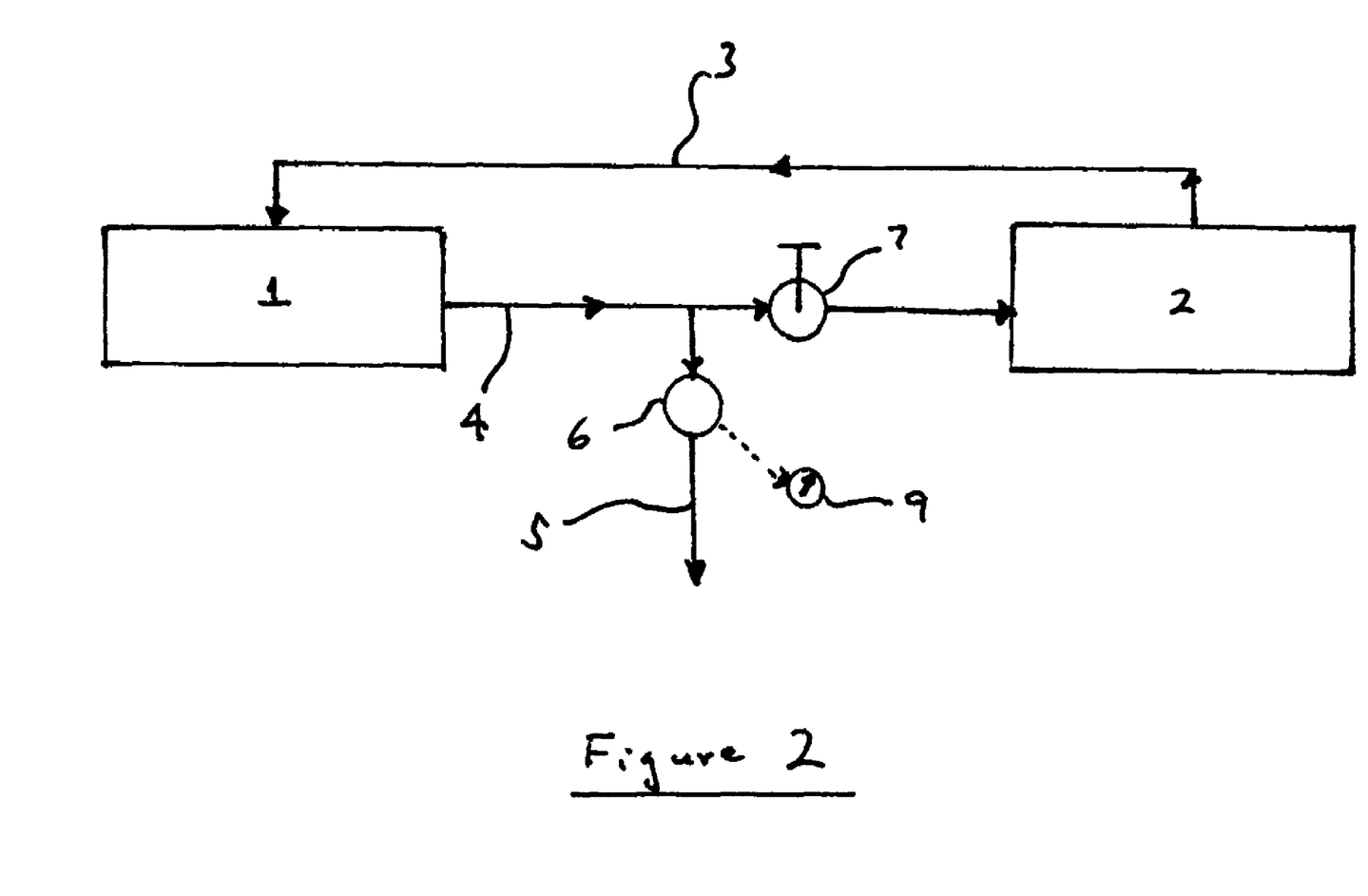
FIG. 2 is a schematic flow diagram of an alternate embodiment of the invention to that shown in FIG. 1.

Flow control device 7 is operatively connected to the discharge of pump 1 and includes an adjustable orifice that permits the independent release of pressurized fluid thereby effectively controlling the rate of flow of fluid through conduit 5. The orifice in flow control device 7 would most commonly be comprised of an adjustable choke or valve and may be manually or automatically operable. Where flow control device 7 is operated manually (see FIG. 2) the invention preferably provides a visual indicator responsive to the output signal generated by flow measurement device 6. Typically the visual indicator would be comprised of a gauge 9 that may be read by an operator to determine the flow rate measured by flow measurement device 6. The operator is then presented with the ability to manually adjust flow control device 7 in accordance with fluctuations in the readings presented by gauge 9, and to thereby maintain the flow of fluid as measured by flow measurement device 6 within pre-determined limits.

Where the invention is automated (as in FIG. 1) the adjustable orifice in flow control device 7 is automatically operated by means of a solenoid or similar apparatus, the function of which is dictated by controller 8. Under this structure controller 8 is operatively connected to both flow control device 7 and flow measurement device 6. The output signal generated by the flow measurement device is received by controller 8, which then in turn causes the adjustable orifice in flow control device 7 to open or close as necessary. Adjustments to the orifice will increase or decrease the amount of fluid independently released by flow control device 7 to thereby maintain the flow of pressurized fluid as measured by flow measurement device 6 within pre-determined limits. Depending upon the physical structure of flow measurement device 6, the output signal received by controller 8 may be electric, hydraulic, pneumatic or mechanical. Similarly, depending upon the physical structure and nature of flow control device 7, the adjustment of the orifice within the flow control device may be accomplished through direct mechanical linkage with controller 8 or, alternatively, through the generation of an electric, hydraulic, or pneumatic signal. In a preferred embodiment of the invention controller 8 is a microprocessor control that is programable to automatically adjust the orifice in flow control device 7 in accordance with fluctuations in the output signal received from flow measurement device 6.

Figure 3:
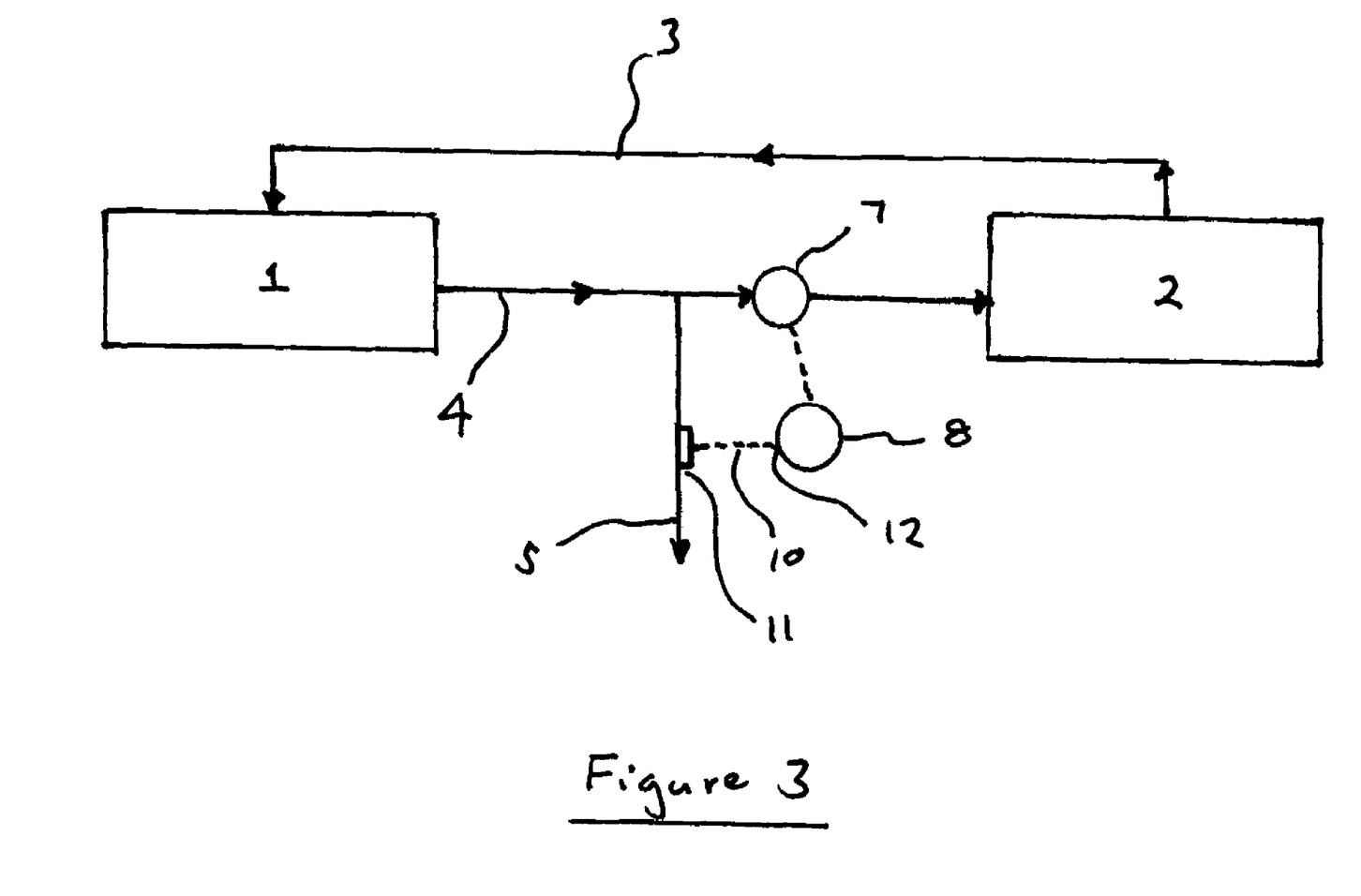
FIG. 3 is a schematic flow diagram of a third embodiment of the invention.
Figure 4:
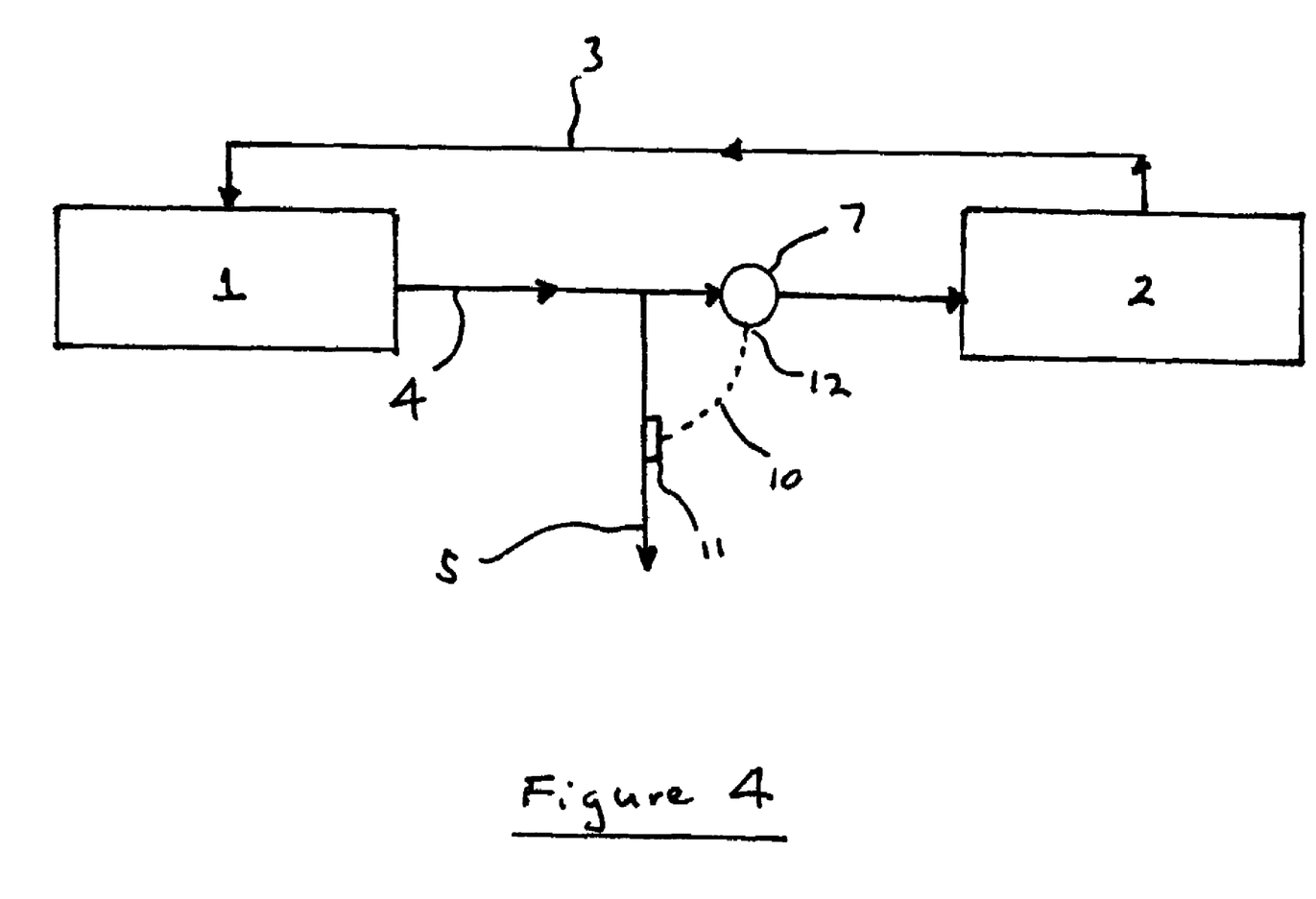
FIG. 4 is a schematic flow diagram of a fourth embodiment of the invention.

In an alternate embodiment of the invention flow measurement device 6 may include a pilot pressure control tube 10 having a first end 11 in communication with conduit 5 and a second end 12 that is either in communication with controller 8 (as in FIG. 3) or that is in direct communication with flow control device 7 (as in FIG. 4). Where pilot pressure control tube 10 is in communication with controller 8 fluctuations in the pilot pressure within tube 10 will result in controller 8 activating fluid control device 7 in order to maintain the flow of fluid through conduit 5 within desired limits. Alternatively, where second end 12 of pilot pressure control tube 10 is in direct communication with flow control device 7, the flow control device will have incorporated within it a pressure sensing or pressure reacting means, which may include a shuttle valve. The pressure sensing or reacting means will react to changes in the pilot pressure in tube 10 and cause an appropriate adjustment in the orifice within flow control device 7 so as to maintain the flow of fluid through conduit 10 at required levels.

From a thorough understanding of the invention it will be apparent that the described structure will permit the control of the rate of flow of pressurized fluid through or discharged from conduit 5, to the extent that the fluid flow is below that at which pump 1 is capable of producing on its own. Regardless of the particular forms of flow measurement device 6 and flow control device 7 that are used, through monitoring the flow of fluid through conduit 5 and making appropriate adjustments to flow control device 7 to independently release a portion of the pressurized fluid emanating from pump 1, the volumetric flow through conduit 5 can be controlled and effectively set at any rate from essentially zero through to the full pumping capacity of pump 1. Automation of the system through the utilization of controller 8 and an automatically adjustable orifice within flow control 7 permits an operator to effectively set the desired rate of flow through conduit 5 and proceed with confidence that the flow rate will be maintained so long as there is a sufficient capacity of pressurized fluid being produced by pump 1. The described system may be included in the design of an original pumping system, or may be constructed for retrofit application to existing pump systems by merely taping or teeing into the discharge line of an existing pump.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while in FIG. 1 flow measurement device 6 is shown as operatively connected to conduit 5 upstream of flow control device 7, the flow measurement device may equally be situated so as to determine the rate of flow of pressurized fluid that is independently released by flow control device 7 (ie downstream of the flow control device). That is, depending upon the relative positioning of flow measurement device 6, and for a constant pumping rate, the volumetric flow of fluid through conduit 5 may be determined directly through the connection of the flow measurement device to conduit 5 or, alternatively, through measuring the volume of fluid independently released by flow control device 7 and comparing the independently released volume with the pumping rate of pump 1. It will also be appreciated that while flow control device 7 has been described as a choke or valve, it could equally take the form of a wide variety of other structures, including a two-way or three-way valve, a shuttle valve, etc.

In addition, it will be appreciated that the monitoring and operation of the described system may be accomplished by a controller operatively placed between flow measurement device 6 and flow control device 7. Flow control device 7 may also be operated directly by signals generated by flow measurement device 6 that are sent specifically to flow control device 7 without the use of an intermediary controller. In such an embodiment the flow measurement and flow control devices may be located at separate positions within the pumping system or may be integrated into a single component. As discussed above such signals may be mechanical, electrical, hydraulic, pneumatic or pilot pressure signals.

We claim:

1. An apparatus to control the rate of flow of pressurized fluid through a conduit connected to a discharge of a pump which draws fluid from a reservoir, the apparatus permitting the discharge of fluid from the conduit at a rate below the output rate of the pump, the apparatus comprising:
   (i) a flow measurement device operatively associated with said conduit and for generating an output signal proportionate to the rate of flow of fluid through said conduit;
   (ii) an adjustable flow control device operatively connected to said pump discharge downstream of the connection of said conduit to said pump discharge, said flow control device including an adjustable orifice wherein upon the opening of said orifice a portion of the fluid from said pump discharge is independently released and injected into a work stream of a wellbore, wherein said flow control device, together with the pump and reservoir, forming part of a continuous loop fluid circuit, said flow control device being adjustable to control the release of pressurized fluid from the continuous loop fluid circuit.

2. The apparatus as claimed in claim 1 including a controller operatively associated with said flow control device and for receiving an output signal generated by said flow measurement device, said controller causing said adjustable orifice in said flow control device to open or close as necessary to maintain the flow of fluid through said conduit within desired limits.

3. An apparatus to control the rate of flow of pressurized fluid through a conduit connected to a pump that draws fluid from a reservoir, the apparatus permitting a discharge of fluid from said conduit at a rate below the output rate of the pump, the apparatus comprising:
   (i) a flow measurement device for generating an output signal proportionate to the rate of flow of said fluid there through, said flow measurement device being operatively connected to said conduit;
   (ii) an adjustable flow control device for permitting a portion of said pressurized fluid to be independently released from said conduit to maintain the flow of pressurized fluid as measured by said flow measurement device within pre-determined limits, said flow control device being operatively connected to said conduit downstream of said flow measurement device wherein said portion of said stream of pressurized fluid independently released from said conduit by said flow control device is injected into a work stream of a wellbore and said flow control device, together with the pump and reservoir forming part of a continuous loop fluid circuit, said flow control device being adjustable to control the release of pressurized fluid from the continuous loop fluid circuit.

4. The apparatus as claimed in claim 3 including a visual indicator for responding to said output signal generated by said flow measurement device.

5. The apparatus as claimed in claim 4 wherein said visual indicator comprises a gauge for indicating the volumetric flow of fluid as measured by said flow measurement device.

6. The apparatus as claimed in claim 3 including a controller for receiving said output signal generated by said flow measurement device, said controller being operably connected to said flow control device, said flow control device including an adjustable orifice wherein said controller upon receiving said output signal generated by said flow measurement device causes said adjustable orifice in said flow control device to open or close as necessary to maintain the flow of pressurized fluid as measured by said flow measurement device within pre-determined limits.

7. The apparatus as claimed in claim 6 wherein said controller is a microprocessor control, said microprocessor control being programmable to adjust said flow control device to maintain the flow of fluid as measured by said flow measurement device within a pre-determined range.

8. The apparatus as claimed in claim 6 wherein said controller is a flow controller.

9. The apparatus as claimed in claim 3 wherein said flow measurement device includes a turbine in communication with said pressurized fluid passing through said conduit.

10. The apparatus as claimed in claim 3 wherein said flow measurement device includes a pressure sensor and said output signal comprises a pressure signal.

11. The apparatus as claimed in claim 3 wherein said flow measurement device includes a pitot tube.

12. The apparatus as claimed in claim 3 including a pilot pressure control tube having a first end in communication with said conduit and a second end in communication with said flow control device, said flow control device including an orifice adjustable in response to fluctuations in fluid pressure within said pilot pressure control tube whereby adjustments to the size of said orifice alters the volume of fluid released from said conduit by said flow control device to thereby maintain the flow of fluid as measured by said flow measurement device within pre-determined limits.

13. A method to control the rate of flow of pressurized fluid through a conduit connected to a pump that draws fluid from a reservoir, the method permitting a discharge of said fluid from said conduit at a rate below the output rate of the pump, the method comprising the steps of:
(i) with a flow measurement device determining the rate of flow of fluid through a portion of said conduit and generating a signal proportionate to said fluid flow rate; and,
(ii) comparing said generated signal to a pre-determined value and activating an adjustable flow control device operatively connected to said conduit, downstream of said portion of said conduit, to permit a portion of said pressurized fluid to be independently released from said conduit to maintain the flow of pressurized fluid as measured by said flow measurement device within pre-determined limits wherein said portion of said stream of pressurized fluid independently released from said conduit by said flow control device is injected into a work stream of a wellbore and said flow control device, together with the pump and reservoir, forming part of a continuous loop fluid circuit, said flow control device being adjustable to control the release of pressurized fluid from the continuous loop fluid circuit.

14. The method as claimed in claim 13 including the further step of directing said signal to a controller operatively connected to said adjustable flow control device, said controller upon receiving said signal causing said adjustable flow control device to open or close as necessary to maintain the flow of pressurized fluid as measured by said flow measurement device within said pre-determined limits.

15. The method as claimed in claim 14 wherein said controller is a flow controller.

16. An apparatus to control the rate of flow of a stream of pressurized fluid through a conduit connected to a pump that draws fluid from a reservoir, the apparatus comprising:
(i) a flow measurement device for generating an output signal proportionate to the rate of flow of said fluid there through, said flow measurement device being operatively connected to said conduit;
(ii) a flow control device operatively connected to said conduit downstream of said flow measurement device, said flow control device including an adjustable orifice wherein upon the opening of said orifice a portion of said stream of pressurized fluid is independently released from said conduit by said flow control device; and,
(iii) a controller operatively connected to said flow control device for receiving said output signal generated by said flow measurement device and for causing said adjustable orifice in said flow control device to open or close as necessary to maintain the flow of pressurized fluid as measured by said flow measurement device within pre-determined limits wherein said portion of said stream of pressurized fluid independently released from said conduit by said flow control device is injected into a work stream of a wellbore and said flow control device, together with the pump and reservoir, forming part of a continuous loop fluid circuit, said flow control device being adjustable to control the release of pressurized fluid from the continuous loop fluid circuit.

17. The apparatus as claimed in claim 16 wherein said flow control device includes an automatically adjustable choke or valve.

18. The apparatus as claimed in claim 16 wherein said flow measurement device includes a turbine in communication with said stream of pressurized fluid.

19. The apparatus as claimed in claim 16 wherein said flow measurement device includes a pressure sensor and said output signal comprises a pressure signal.

20. The apparatus as claimed in claim 16 wherein said flow measurement device includes a pitot tube, the output of said pitot tube operatively connected to said controller.

21. The apparatus as claimed in claim 16 wherein said flow measurement device includes a pilot pressure tube, said pilot pressure tube having a first end in communication with said conduit and a second end in communication with said controller.

22. The apparatus as claimed in claim 16 wherein said controller is a microprocessor control, said microprocessor control being programmable to automatically adjust said orifice in said flow control device in accordance with fluctuations in said output signal received from said flow measurement device to maintain the flow of fluid as measured by said flow measurement device within a pre-determined range.

23. The apparatus as claimed in claim 16 wherein said controller is a flow controller.

24. A method of controlling the rate of flow of a stream of pressurized fluid through a conduit connected to a pump that draws fluid from a reservoir, the method comprising the steps of:
(i) with a flow measuring device determining the rate of flow of fluid through a portion of said conduit and generating a signal proportionate to said fluid flow rate;
(ii) directing said signal to a controller operatively connected to a flow control device, said flow control device operatively connected to said conduit downstream of said portion of said conduit and including an adjustable orifice wherein upon the opening of said orifice a portion of said stream of pressurized fluid is independently released from said conduit by said flow control device; and,
(iii) with said controller, comparing said signal to a pre-determined value and activating said flow control device to open or close said adjustable orifice as necessary to maintain the flow of pressurized fluid as measured by said flow measurement device within pre-determined limits wherein said portion of said stream of pressurized fluid independently released from said conduit by said flow control device is injected into a work stream of a wellbore and said flow control device, together with the pump and reservoir, forming part of a continuous loop fluid circuit, said flow control device being adjustable to control the release of pressurized fluid from the continuous loop fluid circuit.

25. The method as claimed in claim 24 wherein said step of determining the rate of flow of said fluid through said portion of said conduit includes the utilization of a turbine placed in communication with said stream of pressurized fluid such that the rotation of said turbine results in the generation of said signal.

26. The method as claimed in claim 24 wherein said step of determining the rate of flow of said pressurized fluid through said portion of said conduit includes the measurement of the pressure of said fluid in said portion of said conduit and the generation of a proportionate pressure signal.

27. The method as claimed in claim 24 wherein said controller is a microprocessor control, said method further including a step of programming said microprocessor control to automatically adjust said orifice in said flow control device in accordance with fluctuations in said signal to maintain the flow of fluid as measured by said flow measurement device within a pre-determined range.

28. The apparatus as claimed in claim 24 wherein said controller is a flow controller.

29. An apparatus to control the rate of flow of a stream of pressurized fluid through a conduit connected to a pump that draws fluid from a reservoir, the apparatus comprising:
(i) a flow measurement device for generating an output signal proportionate to the rate of flow of said fluid there through, said flow measurement device operatively associated with said conduit;
(ii) a flow control device operatively associated with said conduit downstream of said flow measurement device, said flow control device including an adjustable orifice where upon the opening of said orifice a portion of said stream of pressurized fluid is independently released from said conduit by said flow control device, said flow control device is part of a continuous loop fluid circuit and is adjustable to control the release of pressurized fluid from the continuous loop fluid circuit; and,
(iii) a controller operatively associated with said flow control device for receiving said output signal generated by said flow measurement device and for causing said adjustable orifice to open or close as necessary to maintain the flow of pressurized fluid as measured by said flow measurement device within pre-determined limits wherein said portion of said stream of pressurized fluid independently released from said conduit by said flow control device is injected into a work stream of a wellbore and said flow control device, together with the pump and reservoir, forming part of a continuous loop fluid circuit, said flow control device being adjustable to control the release of pressurized fluid from the continuous loop fluid circuit.

30. The apparatus as claimed in claim 29 wherein said controller is a flow controller.

31. A method of controlling the rate of flow of a stream of pressurized fluid through a conduit connected to a pump that draws fluid from a reservoir, the method comprising the steps of:
(i) with a flow measuring device determining the rate of flow of fluid through a portion of said conduit and generating a signal proportionate to said fluid flow rate;
(ii) directing said signal to a controller operatively associated with a flow control device, said flow control device operatively associated with said conduit downstream of said portion of said conduit and including an adjustable orifice where upon the opening of said orifice a portion of said stream of pressurized fluid is independently released from said conduit by said flow control device, said flow control device is part of a continuous loop fluid circuit and is adjustable to control release of pressurized fluid from the continuous loop fluid circuit; and,
(iii) with said controller, comparing said signal to a pre-determined value and activating said flow control device to open or close said adjustable orifice as necessary to maintain the flow of pressurized fluid as measured by said flow measurement device within pre-determined limits wherein said portion of said stream of pressurized fluid independently released from said conduit by said flow control device is injected into a work stream of a wellbore and said flow control device, together with the pump and reservoir, forming part of a continuous loop fluid circuit, said flow control device being adjustable to control the release of pressurized fluid from the continuous loop fluid circuit.

32. The method as claimed in claim 31 wherein said controller is a flow controller.

* * * * *